United States Patent
Derbis et al.

(10) Patent No.: US 10,150,419 B2
(45) Date of Patent: Dec. 11, 2018

(54) LINKAGE FOR RETRACTABLE RUNNING BOARD

(71) Applicant: FORD GLOBAL TECHNOLOGIES, LLC, Dearborn, MI (US)

(72) Inventors: Leszek Derbis, Auburn Hills, MI (US); Joel Thomas Pierce, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/473,152

(22) Filed: Mar. 29, 2017

(65) Prior Publication Data
US 2018/0281687 A1 Oct. 4, 2018

(51) Int. Cl.
*B60R 3/02* (2006.01)
*B60R 3/00* (2006.01)

(52) U.S. Cl.
CPC .............. *B60R 3/02* (2013.01); *B60R 3/002* (2013.01)

(58) Field of Classification Search
CPC .................................. B60R 3/02; B60R 3/002
See application file for complete search history.

(56) References Cited

U.S. PATENT DOCUMENTS

| | | | |
|---|---|---|---|
| 4,311,346 A * | 1/1982 | Danner | B62D 55/0887 277/402 |
| 4,324,437 A * | 4/1982 | Narang | B62D 55/20 305/106 |
| 4,498,679 A * | 2/1985 | Balczun | F16J 15/3208 277/380 |
| 5,044,812 A * | 9/1991 | Ardelt | E02F 9/006 403/154 |
| 5,842,709 A * | 12/1998 | Maccabee | B60R 3/02 280/166 |
| 5,867,906 A * | 2/1999 | Klassen | F16C 11/045 29/434 |
| 6,149,172 A * | 11/2000 | Pascoe | B60R 3/02 280/163 |
| 6,264,222 B1* | 7/2001 | Johnston | B60R 3/02 105/444 |
| 6,325,397 B1* | 12/2001 | Pascoe | B60R 3/02 280/163 |
| 6,533,303 B1* | 3/2003 | Watson | B60R 3/02 182/150 |
| 6,846,051 B2* | 1/2005 | Bottom | B21L 9/08 305/105 |

(Continued)

FOREIGN PATENT DOCUMENTS

CN 203372142 U 1/2014
DE 102012109043 A1 3/2014

(Continued)

*Primary Examiner* — Jacob B Meyer
(74) *Attorney, Agent, or Firm* — Carlson, Gaskey & Olds, P.C.

(57) ABSTRACT

A retractable running board assembly according to an exemplary aspect of the present disclosure includes, among other things, a running board and a linkage connected to the running board. The linkage includes a hinge provided by a pin rotatable relative to a bushing, which is provided in a recess in the linkage. Further, a seal is provided in the recess between the bushing and an opening of the recess.

22 Claims, 3 Drawing Sheets

(56) References Cited

U.S. PATENT DOCUMENTS

| | | | |
|---|---|---|---|
| 7,513,565 B2 * | 4/2009 | Watson | B60R 3/002 |
| | | | 280/163 |
| 8,460,115 B2 * | 6/2013 | Kruppa | F16C 33/767 |
| | | | 464/133 |
| 2005/0173886 A1 * | 8/2005 | Leitner | B60R 3/02 |
| | | | 280/166 |
| 2008/0073972 A1 * | 3/2008 | Mulligan | B62D 55/0887 |
| | | | 305/203 |
| 2016/0023609 A1 * | 1/2016 | Watson | B60R 3/02 |
| | | | 280/166 |
| 2018/0001825 A1 * | 1/2018 | Long | B60R 3/02 |

FOREIGN PATENT DOCUMENTS

| | | |
|---|---|---|
| EP | 1571042 A1 | 9/2005 |
| KR | 100856458 B1 | 9/2008 |

* cited by examiner

LINKAGE FOR RETRACTABLE RUNNING BOARD

BACKGROUND

This disclosure relates to a linkage for a retractable running board.

Sport utility vehicles (SUVs) and other vehicles, such as four wheel drive (4WD) vehicles, have a relatively high ground clearance, meaning the floor is at a relatively high elevation above the ground. The increased ground clearance makes it difficult for some users to enter and exit the vehicle.

Running boards are known, and have been used to provide assistance for entering and exiting vehicles with a high ground clearance. Some retractable running board assemblies (sometimes referred to as power running board assemblies or electric running board assemblies) include a running board that is pivotally connected the vehicle by one or more linkages. The linkages are driven by an actuator, which together are configured to move the running board between a retracted position and a deployed position.

SUMMARY

A retractable running board assembly according to an exemplary aspect of the present disclosure includes, among other things, a running board and a linkage connected to the running board. The linkage includes a hinge provided by a pin rotatable relative to a bushing. The bushing is provided in a recess in the linkage. Further, a seal is provided in the recess between the bushing and an opening of the recess.

In a further non-limiting embodiment of the foregoing assembly, the seal is an O-ring provided about the pin.

In a further non-limiting embodiment of any of the foregoing assemblies, the linkage includes a first link and a second link, the first link is connected to the running board and the second link is rotatably connected to a vehicle body. The recess is provided in the second link.

In a further non-limiting embodiment of any of the foregoing assemblies, the recess has a first section adjacent the opening and extending along a first length of the recess, the first section includes a circumferential channel receiving the seal, and the first section has a first diameter along a majority of the first length.

In a further non-limiting embodiment of any of the foregoing assemblies, the recess has a second section adjacent the first section and extending along a second length of the recess. The second section has a second diameter less than the first diameter along a majority of the second length.

In a further non-limiting embodiment of any of the foregoing assemblies, the recess includes a stepped surface between the first section and the second section, the bushing has a cylindrical portion and a flange at one end of the cylindrical portion, the cylindrical portion is received in the second section of the recess, and the flange abuts the stepped surface.

In a further non-limiting embodiment of any of the foregoing assemblies, the pin is connected to the first link and projects into the recess, the pin has a first diameter along a first section of the pin and a second diameter less than the first diameter along a second section of the pin, the first section of the pin is at least partially received in the first section of the recess, and the second section of the pin is at least partially received in the cylindrical portion of the bushing.

In a further non-limiting embodiment of any of the foregoing assemblies, the pin is rotatably fixed relative to the first link.

In a further non-limiting embodiment of any of the foregoing assemblies, the recess is a first recess provided in a first side of the second link, the pin is a first pin, the linkage includes a second hinge including a second pin projecting from the first link into a second recess in a second side of the second link, a second bushing is provided in the second recess, and a second seal is provided between the second bushing and an opening of the second recess.

In a further non-limiting embodiment of any of the foregoing assemblies, the first and second recesses are disposed along a common axis.

In a further non-limiting embodiment of any of the foregoing assemblies, a depth of the recess is less than a width of the second link.

In a further non-limiting embodiment of any of the foregoing assemblies, a depth of the recess is less than half the width of the second link.

In a further non-limiting embodiment of any of the foregoing assemblies, the assembly includes a motor coupled to the linkage, and the motor is configured to adjust a position of the linkage to move the running board between a retracted position and a deployed position.

In a further non-limiting embodiment of any of the foregoing assemblies, the linkage is a first linkage rotatably connecting the running board to a vehicle body, the assembly further comprises a second linkage rotatably connecting the running board to the vehicle body, and the motor is directly coupled to one of the first linkage and the second linkage, and the other of the first linkage and second linkage is a follower linkage.

A linkage for a retractable running board according to an exemplary aspect of the present disclosure includes, among other things, a first link, a pin connected to the first link, and a second link rotatable relative to the first link. The second link includes a recess, and a bushing is provided in the recess. Further, a seal is provided between the bushing and an opening of the recess, and the pin is received at least partially in the bushing.

In a further non-limiting embodiment of the foregoing linkage, the seal is an O-ring provided about the pin.

In a further non-limiting embodiment of any of the foregoing linkages, the recess is provided by a socket formed in the second link.

In a further non-limiting embodiment of any of the foregoing linkages, the recess includes a first section having a first diameter, a second section having a second diameter less than the first diameter, and a stepped surface between the first section and the second section.

In a further non-limiting embodiment of any of the foregoing linkages, the first section of the recess includes a circumferential channel receiving the seal.

In a further non-limiting embodiment of any of the foregoing linkages, the bushing has a cylindrical portion and a flange at one end of the cylindrical portion, the cylindrical portion is received in the second section of the recess, and the flange abuts the stepped surface.

DETAILED DESCRIPTION

This disclosure relates to a linkage for a retractable running board, such as those found on trucks, sport utility vehicles (SUVs), and other vehicles with a relatively high ground clearance. One example retractable running board assembly includes a running board connected to a linkage having a hinge provided by a pin. The pin is rotatable relative to a bushing, which is provided in a sealed recess in the linkage. Such an arrangement protects the bushing from exposure to the outside environment, such as dirt, salt, etc., and thus prolongs the life of the retractable running board assembly.

Figure 1:
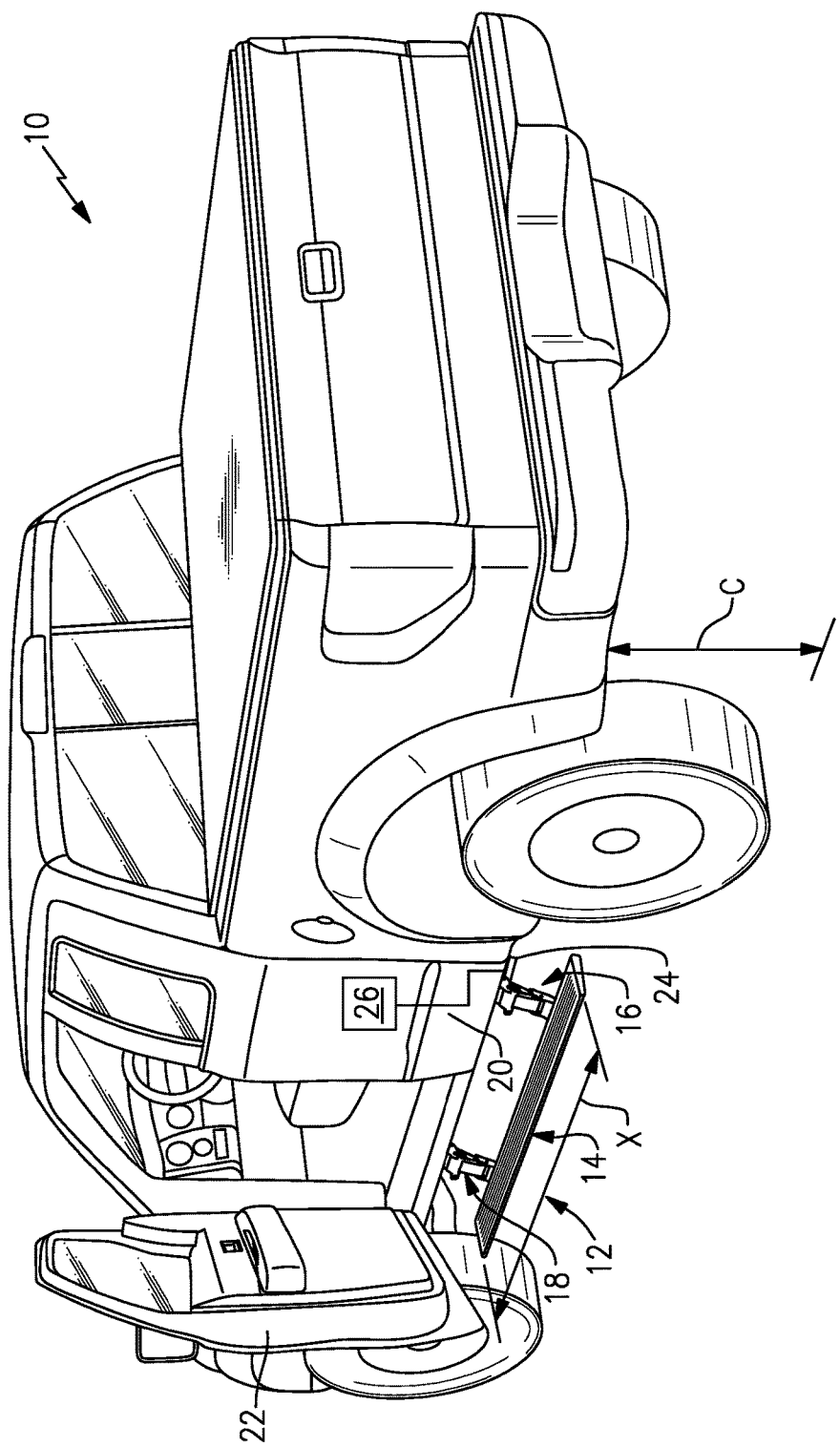
FIG. 1 is a rear-perspective view of a motor vehicle with an example retractable running board assembly.

Referring to the drawings, FIG. 1 is a rear-perspective view of a motor vehicle 10. The vehicle 10 has a relatively high clearance C, which is a distance between a ground surface and a floor of the vehicle 10. As shown, the vehicle 10 is a truck. While a truck is pictured, this disclosure is also applicable to sport utility vehicles (SUVs) and other types of vehicles having a high ground clearance.

The vehicle 10 includes a retractable running board assembly 12 moveable between a deployed position, which is the position shown in FIG. 1, and a retracted position. In this example, the retractable running board assembly 12 includes a running board 14 and first and second linkages 16, 18 rotatably connecting the running board 14 to a vehicle body 20, which includes the frame and paneling of the vehicle 10. The running board 14 has a length X that at least spans a width of a door 22 of the vehicle 10. When in the deployed position, a user may step on the running board 14 as they enter and exit the vehicle 10.

In this example, the first linkage 16 is directly coupled to a motor 24, which is configured to move the running board 14 between a retracted position and a deployed position. In one example, the motor 24 is in communication with a controller 26 of the vehicle 10, which instructs the motor 24 to move the running board 14 to the deployed position when the door 22 is opened, and further instructs the motor 24 to move the running board 14 to the retracted position when the door 22 is closed.

The controller 26 is shown schematically in FIG. 1. It should be understood that the controller 26 could be part of an overall vehicle control module, such as a vehicle system controller (VSC), or could alternatively be a stand-alone controller separate from the VSC. Further, the controller 26 may be programmed with executable instructions for interfacing with and operating the various components of the vehicle 10. The controller 26 additionally includes a processing unit and non-transitory memory for executing the various control strategies and modes of the vehicle system.

In one example, the motor 24 is an electric motor, and is responsive to instructions from the controller 26 to selectively to adjust a position of the first linkage 16. The second linkage 18 is configured to move in response to movement of the first linkage 16. In other words, the second linkage is a follower linkage. In another example, however, the second linkage 18 could be directly coupled to the motor 24 and the first linkage 16 could be a follower linkage. Further, while two linkages 16, 18 are illustrated in FIG. 1, this disclosure extends to retractable running board assemblies having one or more linkages.

Figure 2:
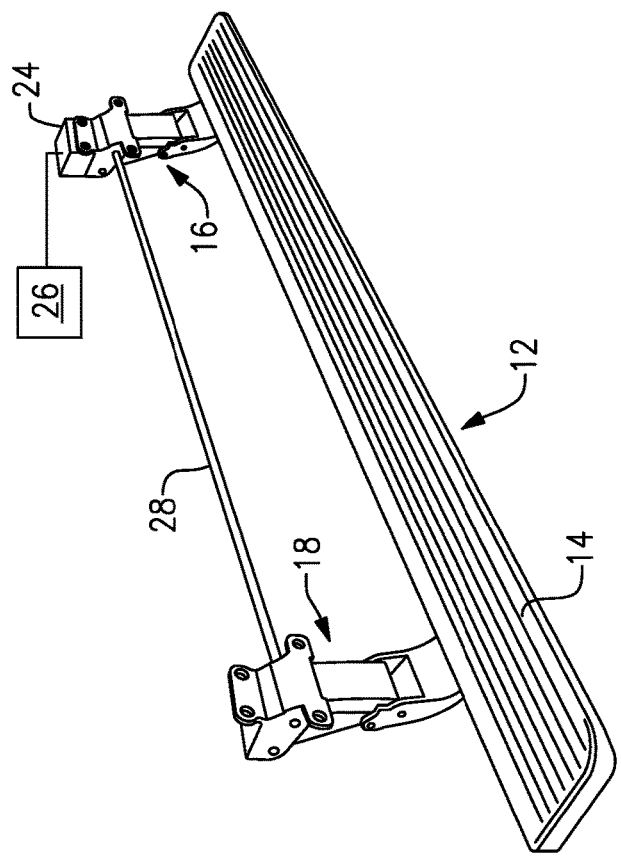
FIG. 2 is a perspective view of an example retractable running board assembly.

FIG. 2 illustrates the retractable running board assembly 12 without showing the vehicle 10, for ease of reference. Again, in this example the first linkage 16 is coupled directly to the motor 24. The second linkage 18 is mechanically coupled to the first linkage 16 by way of a shaft 28, which transmits rotational force from the motor 24 to the second linkage 18. Thus, the first and second linkages 16, 18 move in concert with one another to adjust the position of the running board 14 between the deployed position and the retracted position. Each of the linkages 16, 18 includes a plurality of hinges about which the linkages 16, 18 rotate to adjust the position of the running board.

The detail of the linkages 16, 18 will now be described with reference to the second linkage 18. It should be understood that the first linkage 16 is arranged in substantially the same way as the second linkage 18, except that the first linkage 16 is directly coupled to the motor 24, while the second linkage is coupled to the shaft 28.

Figure 3:
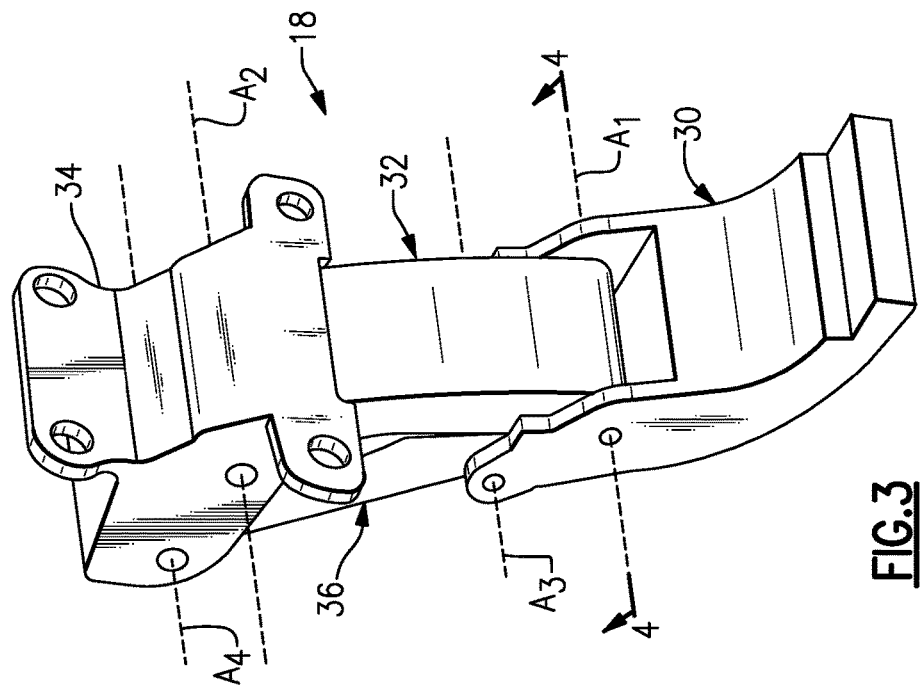
FIG. 3 illustrates an example linkage of the retractable running board assembly.

FIG. 3 illustrates the second linkage 18 without showing the running board 14 or shaft 28 for ease of reference. In this example, the second linkage 18 includes a first link 30 connectable to the running board 14, a second link 32 rotatably connected to the first link 30 and a body mount 34, and a third link 36 rotatably connected to the first link 30 and the body mount 34. The body mount 34 is a bracket that is connectable to a vehicle body 16, such as a portion of the frame on an underside of the vehicle 10.

Continuing with the illustrated example, the second link 32 is rotatably connected to the first link 30 about an axis $A_1$ and rotatably connected to the body mount 34 about an axis $A_2$. Further, the third link 36 is rotatably connected to the first link 30 about a third axis $A_3$ and rotatably connected to the body mount 34 about a fourth axis $A_4$. Accordingly, the linkage 18 is rotatable about four axes $A_1$-$A_4$. While the illustrated example includes three links 30, 32, 36, this disclosure extends to retractable running board assemblies having one or more links.

Figure 4:
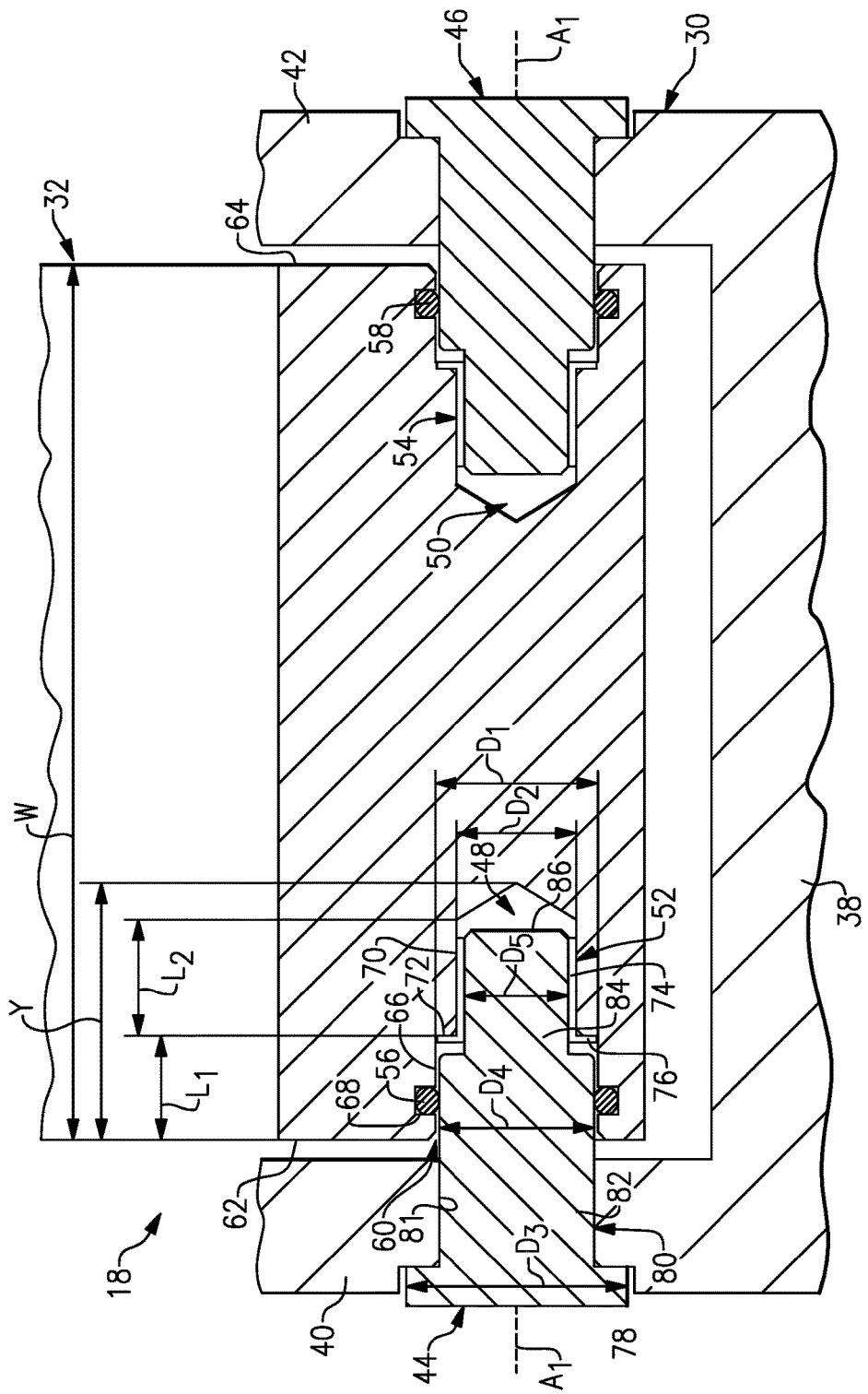
FIG. 4 is a cross-sectional view of the example taken along line 4-4 in FIG. 3, and shows the detail of the example linkage.

FIG. 4 is a cross-sectional view taken along line 4-4 from FIG. 3. FIG. 4 illustrates the connection between the first link 30 and the second link 32 adjacent the first axis $A_1$. It should be understood that the first, second, and third links 30, 32, 36 and the body mount 34 may be connected adjacent the axes $A_2$-$A_4$ in substantially the same way.

With continued reference to FIG. 4, the first link 30 includes a main body 38 and first and second arms 40, 42 projecting from opposite sides of the main body 38. The second link 32 is provided between the first and second arms 40, 42.

The linkage 18 is rotatable about the first axis $A_1$ by way of a hinge including at least one pin rotatable relative to a bushing. In this example, the hinge includes first and second pins 44, 46, projecting from the first link 30 into first and second recesses 48, 50 in the second link 32. The first and second recesses 48, 50 include first and second bushings 52, 54, respectively. The first and second recesses 48, 50 are sealed recesses arranged such that the first and second bushings 52, 54 are substantially isolated from the outside environment.

In one example, the first and second recesses 48, 50 are sealed by respective first and second seals 56, 58 provided therein. In the example, the first and second seals 56, 58 are provided by O-rings, and are disposed about respective pins 44, 46. While O-rings are shown, other types of seals come within the scope of this disclosure. With reference to the first recess 48, the first seal 56 is arranged between the first bushing 52 and an opening 60 of the first recess 48. The second seal 58 is arranged in substantially the same way.

Thus, the first and second seals 56, 58 protect the first and second bushings 52, 54 from the environment (i.e., salt, dirt), and in turn prolong the life of linkage 18 and the retractable running board assembly 12.

In this example, the first and second recesses 48, 50 are sockets, meaning they do not extend through the second link 32. With continued reference to the first recess 48, the first recess 48 is provided in a side 62 of the second link 32 and has an overall depth Y. The second recess 50 is similarly formed in an opposite side 64 of the second link 32. The depth Y of the first recess 48 is less than the width W of the second link 32 between opposite sides 62, 64. More specifically, the depth Y of the first recess 48 is less than half the width W of the second link 32.

With continued reference to the first recess 48, the first recess 48 has a stepped arrangement. In particular, the first recess 48 includes a first section 66 extending from the opening 60 along a first length $L_1$ of the first recess 48. Within the first section 66, the first recess 48 includes a circumferential channel 68, which receives the first seal 56. With the exception of the channel 68, the first recess 48 has a first diameter $D_1$ along the first length $L_1$. Thus, the first recess 48 has the first diameter along a majority of the first length $L_1$.

Adjacent the first section 66, the first recess 48 has a second section 70 having a second diameter $D_2$ less than the first diameter $D_1$. The second section 70 extends along a second length $L_2$ of the first recess 48. The second section 70 exhibits the second diameter $D_2$ along a majority of the second length $L_2$. In this example, the second section 70 exhibits the second diameter $D_2$ along the entirety of the second length $L_2$.

Between the first and second sections 66, 70, the first recess 48 includes a stepped surface 72, which extends in a direction substantially perpendicular to the axis $A_1$ from the first diameter $D_1$ to the second diameter $D_2$. The stepped arrangement of the first recess 48 corresponds to a shape of the first bushing 52.

In this example, the first bushing 52 includes a cylindrical portion 74 and a flange 76 at one end of the cylindrical portion 74. As shown in FIG. 4, the cylindrical portion 74 is received in the second section 70 of the first recess 48, and the flange 76 abuts the stepped surface 72.

The first pin 44 is sized and shaped such that it is partially received in the first bushing 52, and such that it contacts the first seal 56 to create a seal and isolate the first bushing 52 from the environment. Accordingly, in this example, the first pin 44 includes a head portion 78 having a diameter $D_3$. The first pin 44 includes a body portion 80 projecting from the head portion 78 through an opening 81 in the first arm 40. The body portion 80 has a first diameter $D_4$ along a first section 82 adjacent the head portion 78. The body portion 80 also has second diameter $D_5$ less than the first diameter $D_4$ along a second section 84 thereof, which is adjacent an end 86 of the first pin 44.

In this example, a portion of the first section 82 of the first pin 44 is received in the first section 66 of the first recess 48, and a portion of the second section 84 of the first pin 44 is received in the second section 70 of the first recess 48. More particularly, the second section 84 of the first pin 44 is received within the cylindrical portion 74 of the first bushing 52. The first pin 44 is rotatable relative to the first bushing 52 about the axis $A_1$ to provide a hinge and allow rotational movement of the first link 30 relative to the second link 32.

In one example, the first pin 44 is rotatably fixed relative to the first link 30. In the example, the first pin 44 is coupled to the first arm 40 of the first link 30 by a threaded connection. In another example, the first pin 44 is press-fit into the opening 81 of the first arm 40 in such a way that the first pin 44 is not rotatable relative to the first link 30. Alternatively, the first arm 40 may be welded to the first pin 44.

While the above discussion has focused on the first pin 44, the first recess 48, and the first bushing 52, it should be understood that the second pin 46, the second recess 50, and the second bushing 54 are arranged in substantially the same way. In this example, the second pin 46, second recess 50, and second bushing 54 are essentially mirror images of the first pin 44, first recess 48, and first bushing 52.

In this way, the first and second pins 44, 46 are provided on a common axis, which in this example is the first axis $A_1$. Since the first and second pins 44, 46 are separate components, there is no need to provide a single, lengthy pin through the first and second arms 40, 42 and along the entirety of the width W of the second link 32, as has been done in some prior linkages. A single, lengthy pin is difficult to assemble properly. Providing two relatively short pins 44, 46 increases ease of assembly and improves the overall reliability of the retractable running board assembly 12.

It should be understood that terms such as "about," "substantially," and "generally" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A retractable running board assembly, comprising:
   a running board; and
   a linkage connected to the running board, the linkage including a hinge provided by a pin rotatable relative to a bushing, wherein the bushing is provided in a recess in the linkage, and wherein a seal is provided in the recess between the bushing and an opening of the recess.

2. The assembly as recited in claim 1, wherein the seal is an O-ring provided about the pin.

3. The assembly as recited in claim 1, wherein:
   the linkage includes a first link and a second link,
   the first link is connected to the running board and the second link is rotatably connected to a vehicle body, and
   the recess is provided in the second link.

4. The assembly as recited in claim 3, wherein:
   the recess has a first section adjacent the opening and extending along a first length of the recess,
   the first section includes a circumferential channel receiving the seal, and
   the first section has a first diameter along a majority of the first length.

5. The assembly as recited in claim 4, wherein:
   the recess has a second section adjacent the first section and extending along a second length of the recess, and the second section has a second diameter less than the first diameter along a majority of the second length.

6. The assembly as recited in claim 5, wherein:
the recess includes a stepped surface between the first section and the second section,
the bushing has a cylindrical portion and a flange at one end of the cylindrical portion,
the cylindrical portion is received in the second section of the recess, and
the flange abuts the stepped surface.

7. The assembly as recited in claim 5, wherein:
the pin is connected to the first link and projects into the recess,
the pin has a first diameter along a first section of the pin and a second diameter less than the first diameter along a second section of the pin,
the first section of the pin is at least partially received in the first section of the recess, and
the second section of the pin is at least partially received in the cylindrical portion of the bushing.

8. The assembly as recited in claim 7, wherein the pin is rotatably fixed relative to the first link.

9. The assembly as recited in claim 7, wherein:
the recess is a first recess provided in a first side of the second link,
the pin is a first pin,
the linkage includes a second hinge including a second pin projecting from the first link into a second recess in a second side of the second link,
a second bushing is provided in the second recess, and
a second seal is provided between the second bushing and an opening of the second recess.

10. The assembly as recited in claim 9, wherein the first and second recesses are disposed along a common axis.

11. The assembly as recited in claim 3, wherein a depth of the recess is less than a width of the second link.

12. The assembly as recited in claim 11, wherein a depth of the recess is less than half the width of the second link.

13. The assembly as recited in claim 1, further comprising a motor coupled to the linkage, the motor configured to adjust a position of the linkage to move the running board between a retracted position and a deployed position.

14. The assembly as recited in claim 13, wherein:
the linkage is a first linkage rotatably connecting the running board to a vehicle body,
the assembly further comprises a second linkage rotatably connecting the running board to the vehicle body, and
the motor is directly coupled to one of the first linkage and the second linkage, and the other of the first linkage and second linkage is a follower linkage.

15. A linkage for a retractable running board, comprising:
a first link;
a pin connected to the first link; and
a second link rotatable relative to the first link, the second link including a recess, wherein a bushing is provided in the recess and a seal is provided between the bushing and an opening of the recess, the pin received at least partially in the bushing.

16. The linkage as recited in claim 15, wherein the seal is an O-ring provided about the pin.

17. The linkage as recited in claim 15, wherein the recess is provided by a socket formed in the second link, wherein the recess does not extend through the second link.

18. The linkage as recited in claim 17, wherein the recess includes a first section having a first diameter, a second section having a second diameter less than the first diameter, and a stepped surface between the first section and the second section.

19. The linkage as recited in claim 18, wherein the first section of the recess includes a circumferential channel receiving the seal.

20. The linkage as recited in claim 18, wherein:
the bushing has a cylindrical portion and a flange at one end of the cylindrical portion,
the cylindrical portion is received in the second section of the recess, and
the flange abuts the stepped surface.

21. The assembly as recited in claim 1, wherein the seal is entirely provided in the recess.

22. The assembly as recited in claim 21, wherein the recess is a socket and does not extend through the linkage.

* * * * *